United States Patent [19]

Burger et al.

[11] Patent Number: 5,097,533
[45] Date of Patent: Mar. 17, 1992

[54] SYSTEM AND METHOD FOR INTERFACING COMPUTER APPLICATION PROGRAMS WRITTEN IN DIFFERENT LANGUAGES TO A SOFTWARE SYSTEM

[75] Inventors: Brian H. Burger; Domingo S. Hidalgo, both of Austin, Tex.

[73] Assignee: International Business Machines Corporation, Armonk, N.Y.

[21] Appl. No.: 277,372

[22] Filed: Nov. 29, 1988

[51] Int. Cl.$^5$ .............................................. G06F 7/10
[52] U.S. Cl. ................................ 395/500; 364/260.4; 364/260.9; 364/284; 364/226.4; 364/DIG. 1
[58] Field of Search ... 364/200 MS File, 900 MS File

[56] References Cited

U.S. PATENT DOCUMENTS

| | | | |
|---|---|---|---|
| 3,665,421 | 5/1972 | Rehhausser et al. | 364/200 |
| 4,493,027 | 1/1985 | Katz et al. | 364/200 |
| 4,667,290 | 5/1987 | Goss et al. | 364/200 |
| 4,787,035 | 11/1988 | Bourne | 364/200 |
| 4,905,138 | 2/1990 | Bourne | 364/200 |
| 4,961,133 | 10/1990 | Talati et al. | 364/200 |

OTHER PUBLICATIONS

"General Purpose Interface for Extending APL", *IBM Technical Disclosure Bulletin*, 10–71, p. 1559.
"Centaur: The System", P. Borras et al., Institute of National Recherche Inf. Autom., Le Chesnay, France, Dec. 1987, Report No. 777.

*Primary Examiner*—Thomas C. Lee
*Assistant Examiner*—William M. Treat
*Attorney, Agent, or Firm*—Robert M. Carwell

[57] ABSTRACT

A support system and method for interfacing of computer application programs written in a plurality of languages to a software system such as a database manager of the like. A plurality of generic application program interfaces or entry points are defined having a corresponding plurality of parameters in a consistent form required by the system to execute functions. The parameters are transformations of like parameters associated with the application programs which call the APIs. Processor states corresponding to threads in the application programs are stored in a table shared by the generic APIs. Upon return from the call and execution of the system function, processor state is restored and control returned to the application program. Necessity for separate entry points for applications written in each different supported language is thereby avoided as well as associated increased development effort, maintenance, and support.

10 Claims, 5 Drawing Sheets

SYSTEM AND METHOD FOR INTERFACING COMPUTER APPLICATION PROGRAMS WRITTEN IN DIFFERENT LANGUAGES TO A SOFTWARE SYSTEM

TECHNICAL FIELD

This invention relates to computer system interfacing, and, more particularly, relates to support for the interfacing of applications written in a plurality of languages to a software system.

BACKGROUND ART

First an overview of the problem solved by the invention will be given followed by a more detailed discussion of the problem and attempted solutions of the prior art. In computer systems it is often desirable to support interfacing of applications written in a plurality of computer languages to functions of a software system such as a database manager of the OS/2 TM operating system of the IBM Corporation. However, different computer languages have different interface requirements which means, for example, when a program written in a given language calls another program written in a different language, the later is expected to preserve the contents of certain registers in the processor of the computer system. On the other hand, however, the program being called or "callee" such as a database manager function expects the caller to pass parameter information in a predefined pattern. Examples of such requirements are that (1) some parameters are expected to be a value to be used whereas other parameters are expected to be the address of where the value is; (2) parameters such as an array of bytes may be expected to be null terminated, i.e., to have a last byte of 0; and (3) the order of parameters that are such values and/or addresses may be expected by the callee to be passed by the caller in a specific predefined pattern or order such as values first, or intermixed in a set order.

Because computer languages vary as to such requirements as those hereinbefore illustrated, the problem in supporting interfacing of applications written in different languages conventionally would have to be solved by providing separate interfaces to the database manager or other function set for each language to be supported. Alternatively a new entry point must be designed for each function which could accept parameters in a way acceptable to most computer languages and which would set up a call to the existing entry point, both alternatives having obvious drawbacks in terms of required development effort, maintenance, and the like.

Thus, in summary any time the need arises for one piece of software to interface and access with another (which may include a single kernel of programming services such as a database, an operating system, or even the basic input-output service or "BIOS"), this need for a convention arises of how to communicate, i.e., how to pass parameters, return results or codes or the like consistently. Conventions are established and predefined by each particular programming language each of which has different interface specifications. When both the caller and callee are written in the same programming language because the specifications are identical for the caller and callee applications written in a single language such as FORTRAN or the like interfacing is not problematical inasmuch as these interface requirements are handled by the language. Thus the compiler attends to what must be done to pass and return information such as parameters which need to be passed to the caller, results such as data which must be returned and the like. In a typical database example this data and parameters might include the name of a database to be created which is passed to the callee which creates the database, and a result code, i.e., whether or not the database was created, which must be returned to the caller.

More detailed examples of these conventions which establish precise manners in which applications must communicate follow. In a database kernel for example written in the C-Language assumptions are made that callers must pass names to the kernel for access with a null byte at the end so the kernel recognizes the length or end of the name. Thus, the database continuously made assumptions, for example regarding names coming from anywhere and even internally such as an assumption that a string character would always be null terminated. As an illustration of why this was always a concern, when calling runtime libraries a function would be called without the length of string passed which must have a null terminator and if this was not present the desired function typically could not execute properly. Such required convention implied that the caller also had to be written in the C-Language so that any time a name character string was passed the compiler would consistently add a null automatically so that when the string was passed to the kernel it was recognized as a string. Another language such as FORTRAN might have a different convention for terminating a string whereupon an application written in FORTRAN would not have such a null terminator. However, because the database kernel expects the missing null terminator, the program would not execute correctly.

String termination is only but one specific example of problems associated with requirements of different languages in successful interfacing. Yet another typical different problem interfacing applications written in different languages related to the passing of values and/or addresses. This was typically the most troublesome inasmuch as languages might only pass one or the other or require that they be passed in a certain predetermined order. Thus "call by reference" or "call by value" requirements were another point of inconsistency preventing applications written in different programming languages from effecting successful calls. As a specific example illustrating problems associated with ordering and parameter type requirements, COBOL required that all parameters by value be passed first followed by all parameters of reference with no comingling, whereas FORTRAN only passed by reference.

Yet problems in interfacing applications written in different languages were not even limited to inconsistencies in the manner in which strings or value/reference calls were handled by the various languages but included additional factors such as the amount of current state information of the processor which was stored when the callee such as the database manager assumed control after being called by a given application. Some applications written in one language might expect certain contents of registers to be identical upon return to the application and if not preserved by the database kernel for example prior to their being changed by the kernel the application would not subsequently execute properly. This was particularly a problem with respect to multiple threaded code or multithreading wherein a portion of a program or thread could run asynchronously with the remaining parts of the same or another program. When each program piece was running the state of the machine would be different and yet the same function of the database kernel or other software might be getting called by these different pieces of code. When a second thread called a particular application program interface register state information regarding a prior call of a previous thread stored in memory would conventionally be written over thereby preventing proper subsequent execution of the programs.

In summary then, different interface requirements existed for different programming languages and applications written thereto. If a claim was to be made that a software product such as a database or the like could be accessed by applications written in more than one language, a way must be provided for those applications to call the database successfully which satisfied the requirements of applications written to all languages supported. Accordingly a means was long sought after for effecting interfacing of applications written in a plurality of computer languages. Such a system and method was highly desired moreover which avoided necessity for implementing a separate interface for each function for each application language to be supported. A solution was sought after which further avoided the need for designing a new entry point for each such function which could accept parameters acceptable to a plurality of computer languages to set up a call to an existing entry point. Still further a solution providing for interfacing of applications written in a plurality of computer languages was urgently needed which could substantially reduce development effort, overall maintenance and support involved in providing external entry points to software products from applications written in a wide variety of languages having different interfacing requirements and specifications.

SUMMARY OF THE INVENTION

A support system and method for interfacing of computer application programs written in a plurality of languages to a software system such as a database manager or the like is provided.

For each of a plurality of functions supported by the software, a generic application program interface or entry point is defined having a plurality of parameters in a consistent form required by the system to execute the function. Parameter consistency addressed includes parameter order, null termination, manner of variable passing by value or address, and the like. Each entry point may be called by an application program written in any of the plurality of languages and transforms the parameters of the call into the consistent generic form for execution of the software system function.

The processor state corresponding to a thread is stored in response to the call in a table accessible to and shared by all the generic application program interfaces but not accessible by the application programs. The function of the underlying software system is then called. Upon return from the call and execution of the function by the system, the processor state is restored, and return code information and control is then returned to the application program. The approach obviates the need for separate entry points for applications written in each different supported procedural language. Attendant increased development effort maintenance and support necessary for duplicate entry points for each language is thereby avoided by the catenation and uniform ordering of the interface requirements of the various languages.

In a particular embodiment, an entry point is defined for each of a plurality of functions supported by a database manager such as the creation, destruction, addition or scanning of a database. For each such new entry point defined to the plurality of functions which could be called from each application a set of parameters was defined per the needs of the particular database function, such parameters being uniformly consistent to the database and callable from application programs written in a plurality of languages. One entry point of the embodiment receives indications of string length in different forms resulting from different manners of specifying string length associated with a plurality of different languages and transforms such indications of string length into a uniform format comprehensible by the pre-existing singular requirements of the database manager for string recognition. Specifically a parameter is included in the entry point indicating string length which automatically adds a null byte to designate termination of the string. Also in a preferred embodiment provision is made for multithreaded code in the system of the invention. When a first application program interface is called the system calls the operating system to retrieve the identification number of the calling thread, each thread having a unique identification number. The buffer stores the entire processor state information, and the IDs are used to index into the table. When a particular thread's state information is saved, the information is written over memory space designated only for that particular thread.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

DETAILED DESCRIPTION OF THE PREFERRED EMBODIMENT

Figure 1:
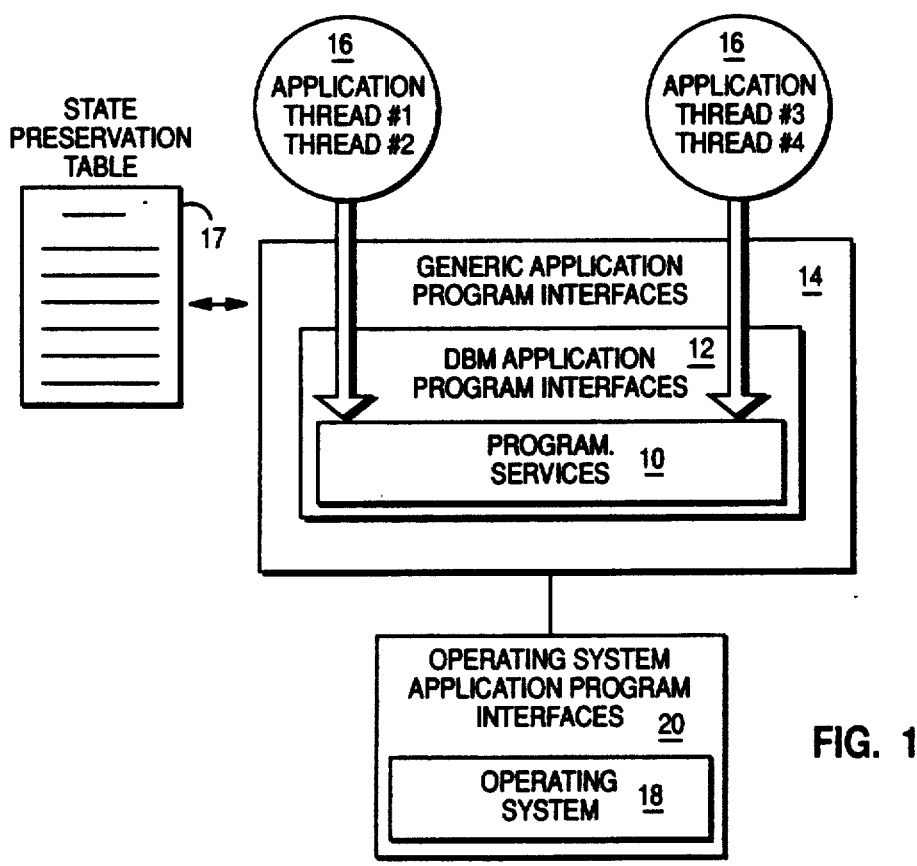
FIG. 1 is a functional block diagram of the system of the invention.

Illustrated in FIG. 1 is a functional block diagram of the computer system of the invention which illustrates the problem giving rise to the need for the invention. In such a system an operating system 18 is typically provided which receives system calls from a plurality of operating system application program interfaces 20. These system calls provide essentially the same purpose as generic APIs 14, i.e., they provide entry points so that application programs 16 can access the operating system 18 to obtain necessary services such as the creation of a window, reading or opening of a file, etc., such functions being similar to the various different functions of the applications 16 in accessing a program 10 such as a database or the like. At this point it will be noted that an embodiment of the invention will be disclosed herein with reference to the OS/2 ™ Extended Edition 1.0 computer program which includes an operating system and database manager function. However, in using a specific operating system and program service 10 to illustrate the invention, the intent is not to limit the application of the invention in this manner and accordingly the inventive concepts herein disclosed are contemplated as being readily adaptable to a wide variety of operating systems 18 and programming services 10.

Still referring to FIG. 1, it will be recalled that one problem associated with prior systems was that the operating system 18 and program services 10 assumed that application 16 would be written in the same language and accordingly application program interfaces such as the APIs 20 to the operating system 18 and the APIs to the particular program services 10 such as database manager APIs 12 were interfaces written to a specific language. Thus, the APIs 12 and 20 were not generic and did not expect to be called from applications 16 written in more than one programming language. Thus, for example, if the database manager program services 10 was written in the C-Language, the associated DBM APIs 12 expected calls from the applications 16 such as a call to create or delete a database to conform to calls in the C-Language and when such calls from the applications 16 were in a different language, the applications 16 would not execute properly. In the present invention, however, a plurality of generic APIs 14 are provided to these pre-existing entry points of the DBM APIs 12 and operating system APIs 20 whereby the invention generalizes existing entries to a plurality of applications 16 written in any of a number of predetermined languages. Thus the function of the generic APIs 14 of the present invention is to transform parameters received in a number of different formats determined by the particular language in which the application 16 is written into forms expected by the DBM APIs 12 and operating system APIs 20 as dictated by the particular procedural language in which these APIs 12 and 20 are written.

Before proceeding to more detailed description of the invention, an additional feature depicted in FIG. 1 will be noted which will also be hereinafter described in greater detail. In accordance with modern programming technique, it is contemplated that application 16 may be of a multi-threaded variety whereby one or more such applications may include a plurality of threads or pieces of code which may run asynchronously with respect to all remaining parts of the same or other programs or applications 16, such threads being functionally designated by $T_1$-$T_4$. In accordance with the invention each time one of such threads calls an API 14 the state information of the processor in the computer executing the system of the invention must be saved in a particular manner in a state preservation table 17. It is a feature of the invention that each thread has a unique thread ID associated therewith as well as a unique memory space or location in the table 17. The processor state for each thread is periodically stored in its unique corresponding location in the table and written over prior such information corresponding to the same thread in a manner to be hereinafter described in greater detail.

Figure 2:
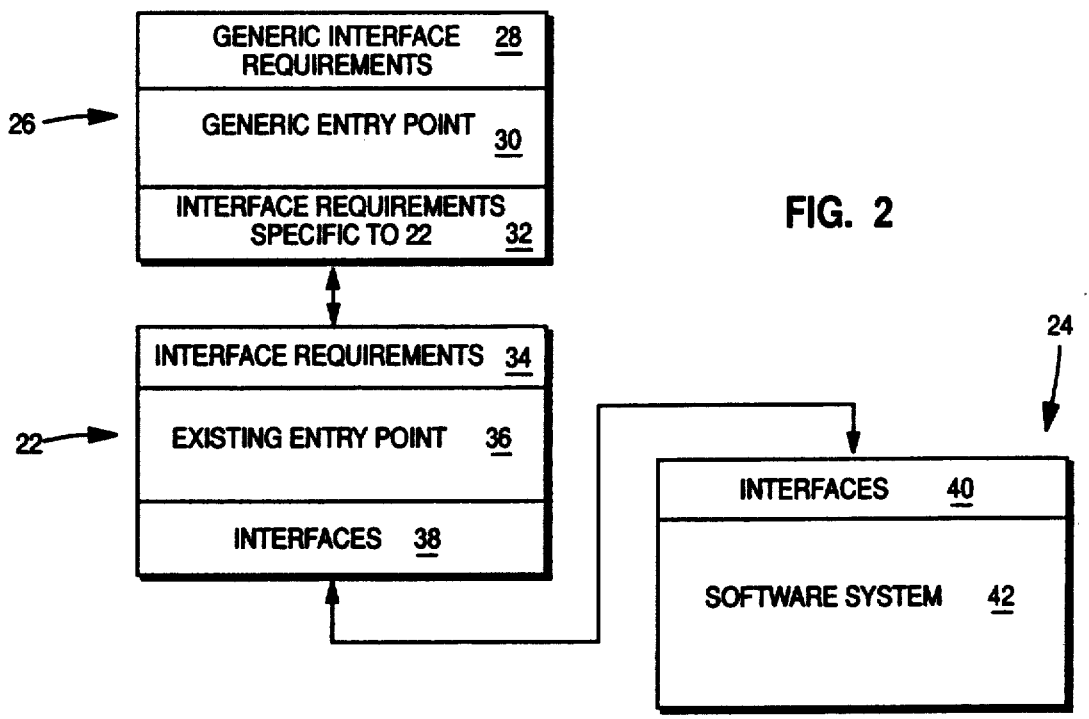
FIG. 2 is another functional block diagram of the system of FIG. 1.
Figure 6:
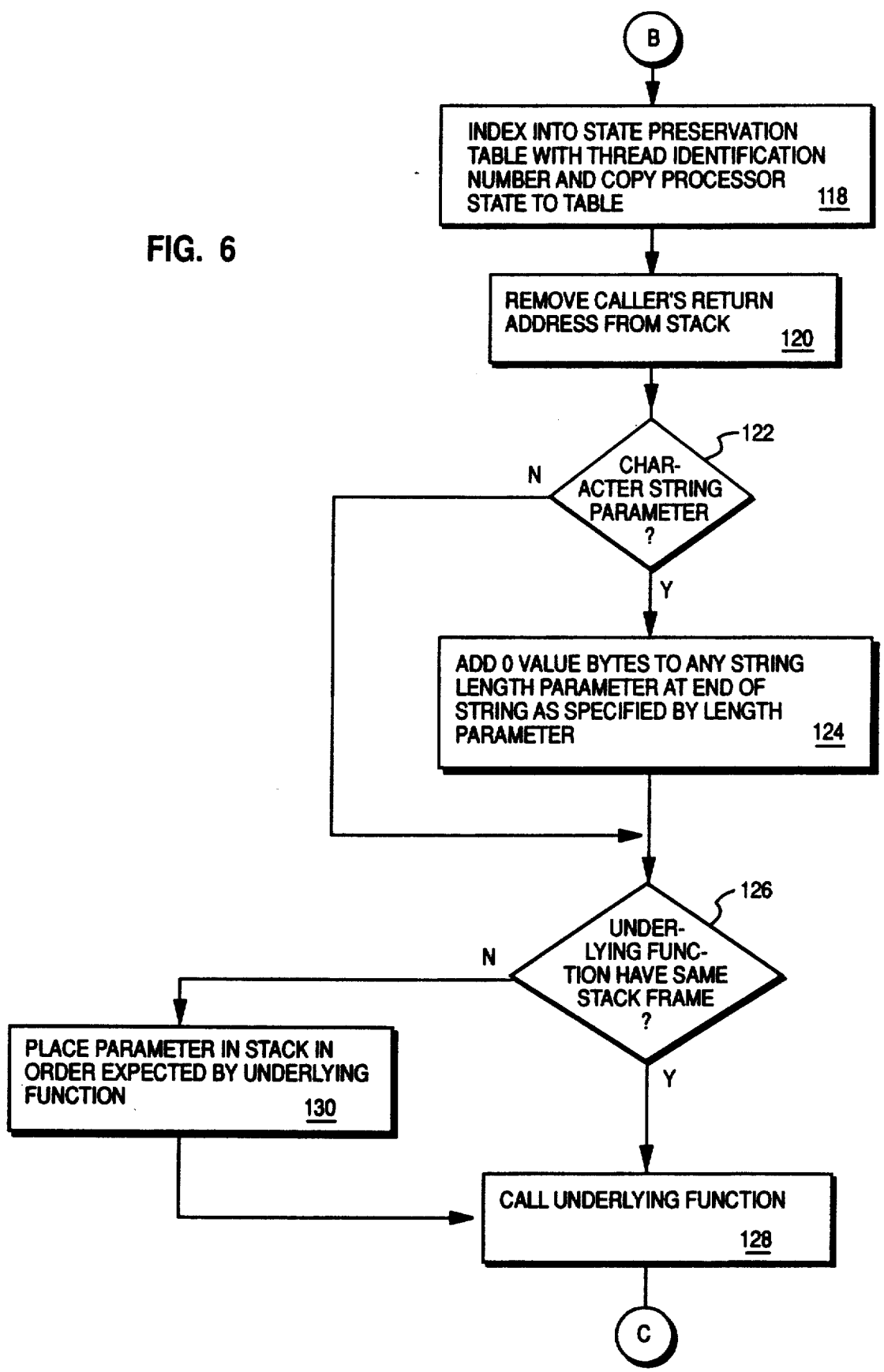
Figure 7:
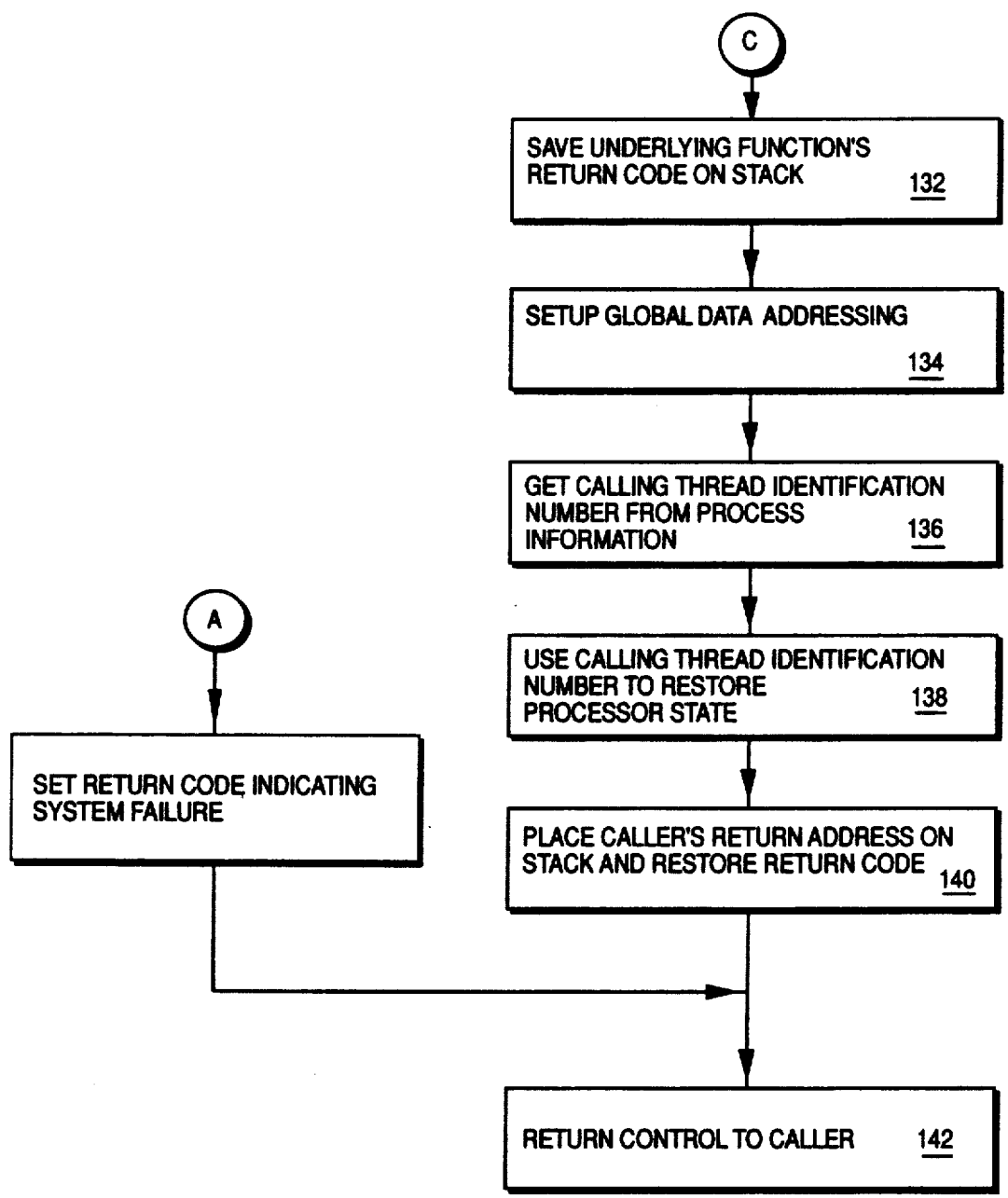

Referencing now FIG. 2 a more detailed description of the workings of the invention will be described. A software system 42 is provided which for purposes of generality may be any system which must be accessed by a plurality of applications and might include an operating system, a database function, or even basic input/output services or BIOS. An interface 40 is provided to the system 42 whereby the system 24 establishes certain requirements such as predefined entry points 36 with interface requirements 34 to the outside world of applications (such as those of FIG. 16 of FIG. 1). The system 22 further therefore establishes requirements of interfaces 38 to the system 42. The interfaces 34 and 38–40 for an operable system are compatible inasmuch as the systems 22 and 24 pre-exist and were written in the same language. It will be recalled that the invention generalizes these existing entries and thereby provides a system 26 with an interface 32 compatible with the interface requirements 34. However it is important to note with respect to FIG. 2 that the system 26 of the invention provides a generic interface 28 to these different applications 16 written in different languages thereby providing a collection of generic entry points 30 to the software system 42. In other words, the system 26 of the invention provides generality to an existing software system 42. Moreover, because systems 22 and 24 pre-exist, the system 26 of the invention may be written as desired in machine code or assembly language whereby the pre-existing interfaces may be changed in a general way providing generality to existing entry points to the software system 42. This is accomplished by manipulating the stack of the processor whereby essentially mapping of interfaces 28 and 32 is effected. In providing such mapping, the caller's return address is removed from the stack as will hereinafter be made clear in a more detailed description with reference to the flow diagrams. In this manner, a call made to the generic entry points 30 appears to the system 22 as if it was coming directly from the application, i.e., the stack is made to appear to the system 22 as if the call was originating directly from the application 16. One function the system 26 does to accomplish this is to remove the return address from the stack whereby the system 22 does not see the return address on the stack but rather the return address from the system 26. In this manner mapping between the generic interface 28 and the interface 34 having specific requirements of the existing entry points 36 is made transparent to the with reference to the FIGS. 5–7 and detailed description thereof which hereinafter follow.

Figure 3:
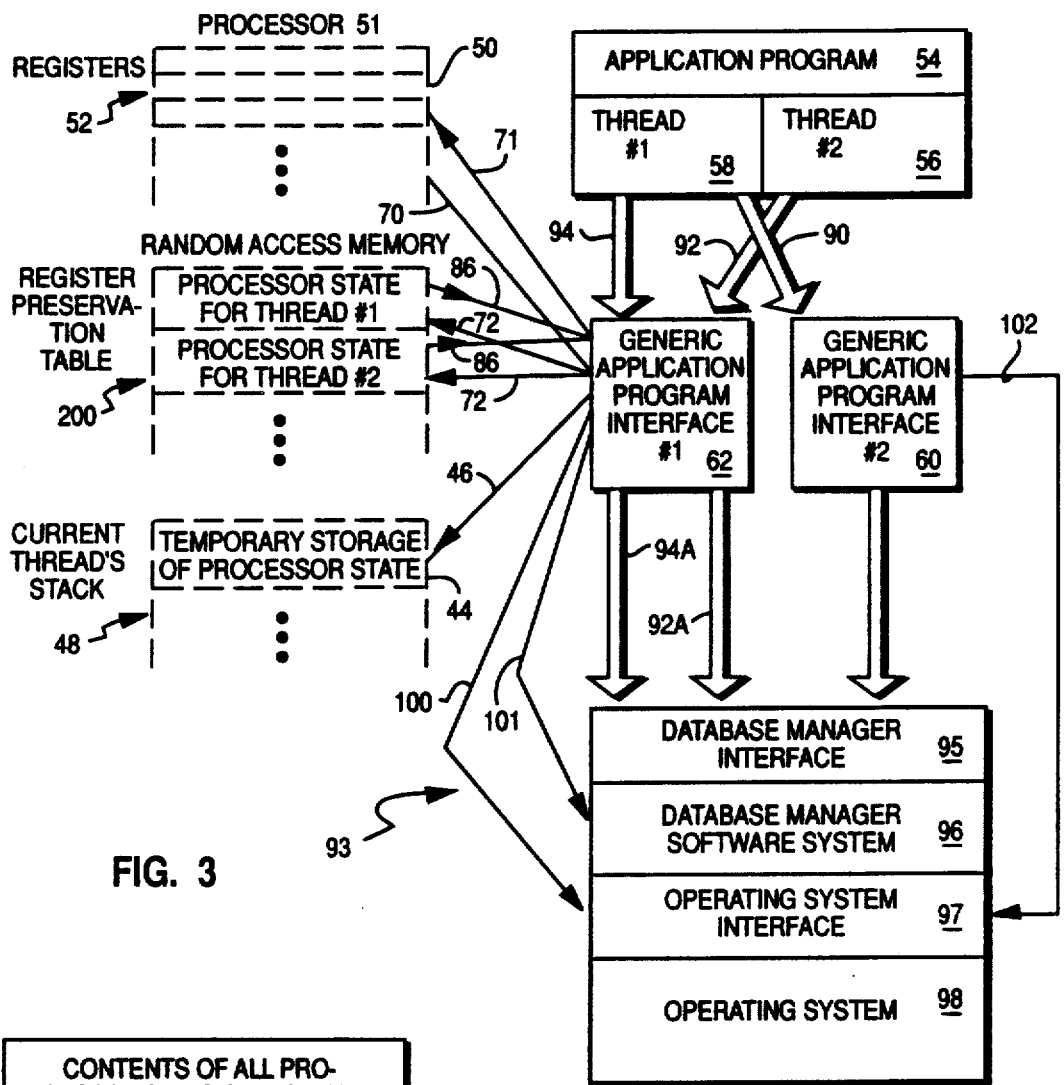
FIG. 3 is a diagram of the invention illustrating interaction with the system processor registers and memory.

Referring now to FIG. 3, a database application program 54 written in a high level computer language is provided for use with the system of the invention depicted therein. Such a program 54 may be structured as two or more asynchronous units or threads of execution as represented conceptually by thread number 1, 58 and thread number 2, 56. Program 54 employes the services of a database manager software system 96. Access to this system 96 is through interface entry points, i.e., function calls, indicated as the database interface 95. These entry points are suitable for access by applications written in the same language as the system 96 or in assembly language. Services provided by the system 96 and accessed by application program 54 (and threads 56, 58) are those services commonly associated with a database management software system such as Release 1.0 of the Extended Edition of the aforementioned OS/2 ™ operating system.

The system 96 accesses the services of the operating system 98 through the operating system interface entry points 97. Services provided by the operating system 98 and accessed by system 96 are those services commonly associated with a computer's operating system. Interface entry points are provided as represented by reference numerals 60 and 62 for access to the system 96 by database applications written in languages other than the language used to write the database manager software and other than the assembly language of the machine employed in the computer system used to implement the invention. Because threads 56 and 58 are asynchronous in their execution, it is possible for them to make simultaneous access calls 92 and 94, respectively, to a generic API such as API 62.

Still referring to FIG. 3, at reference numeral 200 there is indicated a portion of the computer's main memory such as RAM which is reserved and shared by the generic APIs such as API 60 and 62 in order to store the contents of registers 50 of the machines processor 51. The contents of the set of all the processor's registers 50 at any given time is known as the processor's state, as represented generally at 52. The memory, and more particularly a register preservation table therein, at 200 reserves a number of bytes sufficient for storing a number of processor states or entries in the table equal to the maximum number of threads allowed by the operating system 98 in an application. The memory portion 200 will be hereinafter described in greater detail with reference to FIG. 4 which follows. Reference numeral 48 is intended to indicate a portion of the computer's main memory which is used as an information stack for the active or current execution thread. The operating system 98 requires a separate stack for each such execution thread. Upon activation by a call such as call 94, the API reads, as indicated by the arrow 70, the state of a register 52 of the processor 51 and stores it as indicated by arrow 46 in the current thread's stack 48 before it causes the processor's state to change. API 62 makes calls 100 and 101 to obtain identification numbers for each of the calling threads. It will be recalled that each identification number is a unique number assigned by the operating system 98 to a particular thread and is a member of a finite set also defined by the operating system 98.

Once the API 62 has obtained a thread identification number for the call 94 it transfers, as indicated by arrows 72 the processor's state 44 from the stack 48 to the entry in the table 200 corresponding to the thread identification number for call 94 which came from the thread 58. The API 62 then proceeds to make the parameter fixes as described in the algorithm with reference to FIGS. 5-7, after which it makes a call 94A to the database manager interface 95. API 62 is able to do this because it is written in assembly language and therefore can access the interface 95. Upon receiving control back from call 94A, the API 62 reads, as indicated by arrows 86 the entry in table 200 corresponding to the identification number for call 94 and restores, as indicated by arrow 71, the contents of the registers 52 of the processor 51. This step is done as the last step prior to returning control to the caller 58.

The hereinbefore noted steps of the API 62 reading and storing the processor state and making the calls 100 and 101 to obtain the identification numbers could be applied to call 92 by thread 56 as well and could occur simultaneously to the hereinbefore noted steps as described with respect to call 94. Since the thread's identification numbers are unique, then the entries in table 200 used to store the processor's state, as in registers 52 are also unique. This thereby insures preservation of the processor's state regardless of the use of multiple execution threads by the application program 54. A separate generic point 60 sharing the same memory space of the table 200 with API 62 can only be called by a thread 58 after call 94 to API 62 returns execution control to thread 58. This restriction is inherent in the way that the machine instructions, which comprise the code of an execution thread, are performed sequentially. This step of a separate generic entry point 60 sharing the same memory space 200 guarantees that none of the generic API's sharing memory represented by table 200 will be called more than once at the same time from the same thread. This in turn guarantees preservation of the data stored in the entries of table 200 between the time that the copy 72 and restore 86 are performed for any given call.

Figure 4:
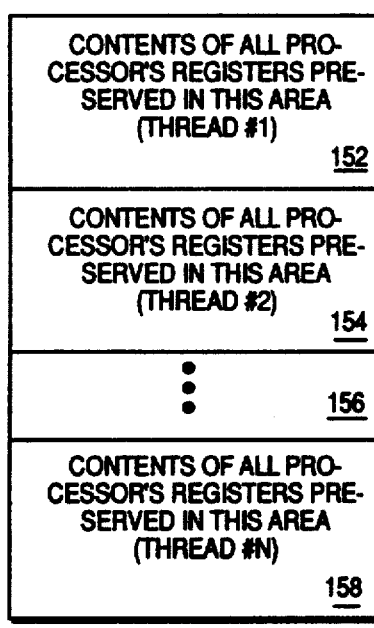
FIG. 4 is a more detailed illustration of the processor state storage feature of the present invention.

Referring now to FIG. 4, a format shown generally and schematically by reference numeral 160 is assigned to a reserved portion of the computer's main memory for use as temporary storage for the processor 51 state information during calls to a set of generic entry points to a database management software system. The description associated with FIG. 3 provides information on the usage context for the format 160. The format 160 is divided into a plurality of entries such as those indicated by reference numerals 152, 154, 156 and 158. An entry in format 160 represents space used to store the contents of each and every register of the machine's main processor. A number of entries N is finite, as shown by boxes 156 and 158, and is assigned by the machine's operating system 98. N corresponds to the maximum number of execution threads allowed per application process. Entries are identified by the identification number of threads on a 1-2-1 correspondence, such that the thread's identification number is used to locate its corresponding entry in format 160.

Figure 5:
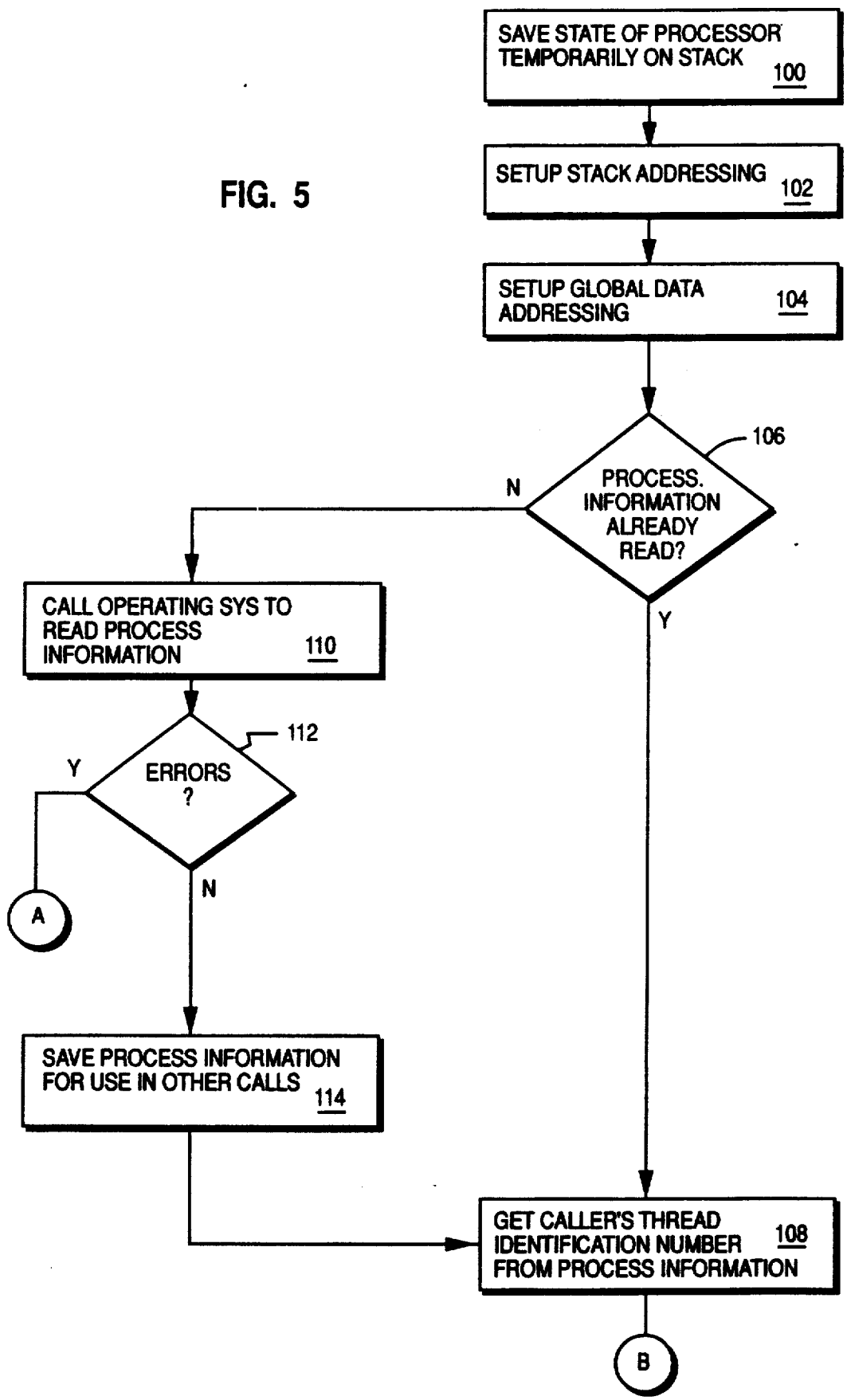
FIGS. 5-7 is a flow diagram for construction of generic application program interfaces in the manner of the present invention.

FIG. 5 is a flow diagram of a software program for implementing the invention. The flow is entered at block 100 from a thread in a given application program 16 of FIG. 1. Before describing in detail the algorithm of FIG. 1 it is helpful to provide an over view of the functions performed thereby. The steps of FIG. 5 illustrate the algorithm by which a generic API of the invention first receives a call from an application program 16 which uses a generalized interface and preserves the state of the computer system's processor at the time of the call. The algorithm then adjusts these parameters to conform to the requirements of an underlying existing function written in a different language of the existing API. The existing API is then called and the state of the processor is restored with resultant information being returned to the application. The generic application 62 such as the first application shown therein in FIG. 3 will store as shown by arrow 46 partial processor state or the current threads stacks 48, such state being stored as shown at reference numeral 44 of FIG. 3. After the processor state has been stored, step 100 of FIG. 5, registers of the processor are set up at 102 such that the API 62 can access the current thread's stack 48. At step 104 a similar procedure sets up the data segments such that the current API 62 can access global data at 80, the register preservation table. With respect to these set up steps 102 and 104, the embodiment under discussion employs processors using segmented addressing modes although the invention is not intended to be so limited. Each API owns a certain amount of memory in the preservation table 80 having a base address which was allocated to each API through the linking process. The "set up" step refers to loading into a data segment corresponding to each API the base address of the memory space in the table 80 corresponding to such API.

At step 106 a test is performed relating to accessing operating system 98 information and, more particularly a block of memory in which the operating system stores information about the current process, i.e., the thread ID of the current caller or application program running. This ID initially has to be provided by the first API called by the current application. As an aside it will be noted that the APIs such as 60 and 62 are all packaged. Each API may be thought of as providing an interface to each of the different services provided by the underlying operating system software 93. In this context "packaging" refers to the fact that all such APIs 60–62 own the global data and, more importantly, own the register preservation table as well as the space where the process information block is stored. In this manner when one of the APIs 60–62 has read the current process information block, subsequent calls to different APIs in the same package would not have to read the block but could simply access it which is the reason for step 104 in setting up global addressing because the block resides in the memory space shared by all of the APIs in the package. In other words, step 104 sets up the addressing for such memory space retaining these blocks.

Still referring to step 106, every API 60–62 will perform this test 106 to determine whether that block has been read. If it has not, a call to the operating system 98 will be made requesting the operating system to read that block and load it into that memory space which belongs to that particular API. Such information will remain in the block and is updated only by the operating system which is why the thread ID at any time will be current. The APIs 60–62 store not the block itself but rather the address of the block in that the block itself belongs to the operating system 98. Consequently, what the APIs share is a memory location containing the address or in other words a pointer to the block updated only by the operating system. The only piece of information the APIs are concerned with in the block is the current threads ID.

After a call is made to the operating system to obtain the address of that block at 110, so the APIs know where to obtain the thread ID, a robustness test 112 determines whether the operating system performed the read successfully. Error detection at 112 sets up a return code at 116 so that an application 54 may be informed that the call from the application could not be completed successfully whereupon control is returned to the caller at 142 due to system error.

If no errors were detected at 112, step 114 is performed wherein the address of the process information block is saved so the APIs can access the block without having to call the operating system every time. At step 108, the information block is used to obtain the current callers thread ID number. The thread ID number of the caller of the calling thread it is important to remember is updated by the operating system 98 as it splits the processor between threads and processes. At step 118, this thread ID number is used to index into the state preservation table to access the area corresponding to that thread ID. The state preservation table contains an entry which is an area where all register or process information is preserved. Every possible thread that an application program can have has a pre-allocated entry into the state preservation table implying the table is a static pre-allocated table. Still at 118 using the thread ID number obtained at step 108 the table is indexed into and the entry is found corresponding to the calling thread's ID number. The partial processor state information saved at step 100 plus the rest of the processor states that have not changed at this point are all saved in that entry to the state preservation table.

Next the algorithm proceeds to step 120 which is basically a step to remove the caller's return address from the stack. The purpose for this step is to be able to make a call to the underlying function or API. This is important only in cases in which there is no need to manipulate the parameters. There are some instances in which the only services performed by the APIs 60–62 is state preservation wherein the parameters might be identical, in other words, parameters might be adequate to the underlying function just as they are when passed by the application. In this case for efficiency reasons, all the generic APIs 60–62 need do is remove the return address from the stack at 120 where upon the algorithm may proceed to step 128.

At step 122 a check is made for presence of any string parameters. At this point it is worth noting that the algorithm as depicted in FIG. 5 is not an execution algorithm but rather an implementation algorithm whereby instances of the algorithm may be coded for each generic API and a given API may not include all elements of the algorithm. For instance step 122 is a step to determine whether to include code in the API to adjust string parameters. At coding time for the algorithm it would be known whether the interface has string parameters at test 122. If so, as indicated at step 124, code would be added to add nulls or zero value bytes at the end of string parameters whereby the end of the string may be found by link parameters which are part of the generalization process. Since it is required that a null be passed as part of the string, it is further required that the length or number of bytes in the string be passed. For a computerized version of the algorithm, steps 122–124 would have substituted therefor a step for adding zero value bytes to any string length parameter without the programmers decision at 122.

At step 126 the algorithm would identify the parameter frame (determined by the order and size of parameters) to the generic API and compare its stack frame to that of the underlying function, and if the same, will proceed to step 128. If the underlying function does not have the same stack frame, at 130 code is provided which will build a stack frame for the underlying function as per its requirements using the stack frame which was passed to the generic APIs. Essentially then step 130 is a remapping of the parameters. In either case, the algorithm proceeds to step 128 calling the underlying function. Upon return from the underlying function, the algorithm proceeds at step 132 to save the temporary return code from the underlying function on the stack. Typically this return code is returned in one of the registers 52, so step 132 amounts to storing a register on the stack, that same register usually being modified by the steps of FIG. 5.

At step 134 global data is once again set up as in the case of step 104 because the registers may have been modified by the underlying function. Step 136 in obtaining the calling thread ID number from the process information is performed which is essentially a repetition of step 108. The algorithm proceeds to step 138 wherein the calling thread ID number obtained at step 136 is used to find again the processor state information previously saved in step 118, i.e., that information is copied back to the processor registers 52 thereby restoring the processor state to the state it was in when the function first was entered. At step 140 the caller's return address obtained at step 120 is now restored back on the stack 48 whereupon the algorithm proceeds at step 142 to return control to the caller.

While the invention has been shown and described with reference to particular embodiments thereof, it will be understood by those skilled in the art that the foregoing and other changes in form and details may be made therein without departing from the spirit and scope of the invention.

We claim:

1. A computer implemented method for interfacing a plurality of application programs each written in a different computer language to a computer software system comprising computer implemented steps of
generating a plurality of generic application program interfaces each responsive to program calls from said application programs;
generating a call from one of said application program interfaces in response to one of said program calls;
executing a function in said system in response to said call from said one of said application program interfaces;
transforming value and reference parameters associated with one of said application programs into transformed parameters in a form compatible with said software system;
storing a processor state corresponding to a portion of said application program running asynchronously relative to remaining parts of said application program;
calling a function of said software system with said transformed parameters;
executing a return from said function call whereby said processor is restored to said processor state and return code information and control is returned to said application program, wherein said executing includes
generating a stack frame with parameters of one of said application programs in a predetermined order comprised of a plurality of value parameters non-interleafed with a plurality of reference parameters; and
constructing a next stack frame with parameters of a next one of said application programs in said predetermined order.

2. The method of claim 1 further including the step of generating a state preservation table comprised of processor state information entry groups each associated with a different thread of a corresponding one of said application programs.

3. The method of claim 2 wherein said table is accessible to said plurality of generic application program interfaces.

4. The method of claim 3 wherein said table is transparent to said calls from said application programs.

5. The method of claim 4 wherein said table is transparent to said software system.

6. A system for interfacing a plurality of application programs each written in a different computer language to a computer software system comprising
means for generating a plurality of generic application program interfaces each responsive to program calls from said application programs;
means for generating a call from one of said application program interfaces in response to one of said program calls;
means for executing a function in said system in response to said call from said one of said application program interfaces;
parameter transformation means for transforming parameters associated with one of said application programs into transformed parameters in a form compatible with said software system;
means for storing a processor state corresponding to a portion of said application program running asynchronously relative to remaining parts of said application program;
means for calling a function of said software system with said transformed parameters;
means for executing a return from said function call whereby said processor is restored to said processor state and return code information and control is returned to said application program;
means for generating a stack frame with parameters of one of said application programs in said predetermined order;
means for constructing a next stack frame with parameters of a next one of said application programs in said predetermined order; and
means for generating a state preservation table comprised of processor state information entry groups each associated with a different thread of a corresponding one of said application programs.

7. A computer implemented method for interfacing a plurality of threaded application programs, each written in a different computer language, to a computer software system having a processor, comprising computer implemented steps of
saving the state of said processor in a state preservation table;
storing each thread of said plurality application programs as a static pre-allocated entry in said table;
setting up stack and global data addressing;
retrieving a caller thread identification;
indexing into said state preservation table with said thread identification;
removing a return address of said caller from said stack;
calling an underlying function of said software system;
storing a return code from said function on said stack;
setting up global data addressing;
returning said caller thread identification;
returning said saved processor state from said state preservation table in response to said retrieved called thread identification;
restoring a processor state to said processor;
storing a return address of said caller on said stack; and
returning control to said caller.

8. The method of claim 1 including
detecting whether said underlying function has a stack frame different from said stack frame; and
storing parameters in said stack transformed in an order predetermined by said underlying function in response to said detecting that said underlying function's stack frame is different.

9. The method of claim 8 further including detecting whether process information has been read; and calling an operating system of said computer system to read said process information in response to said detecting step indicating said process information has not been read.

10. The method of claim 9 further including storing said read process information for use in a next one of said calls.

* * * * *

UNITED STATES PATENT AND TRADEMARK OFFICE
CERTIFICATE OF CORRECTION

PATENT NO. : 5,097,533

DATED : March 17, 1992

INVENTOR(S) : Brian H. Burger and Domingo S. Hidalgo

It is certified that error appears in the above-identified patent and that said Letters Patent is hereby corrected as shown below:

Col. 12, line 61, delete "1" and insert --7--.

Signed and Sealed this

Eighth Day of June, 1993

Attest:

MICHAEL K. KIRK

Attesting Officer

Acting Commissioner of Patents and Trademarks